Patented Feb. 21, 1933

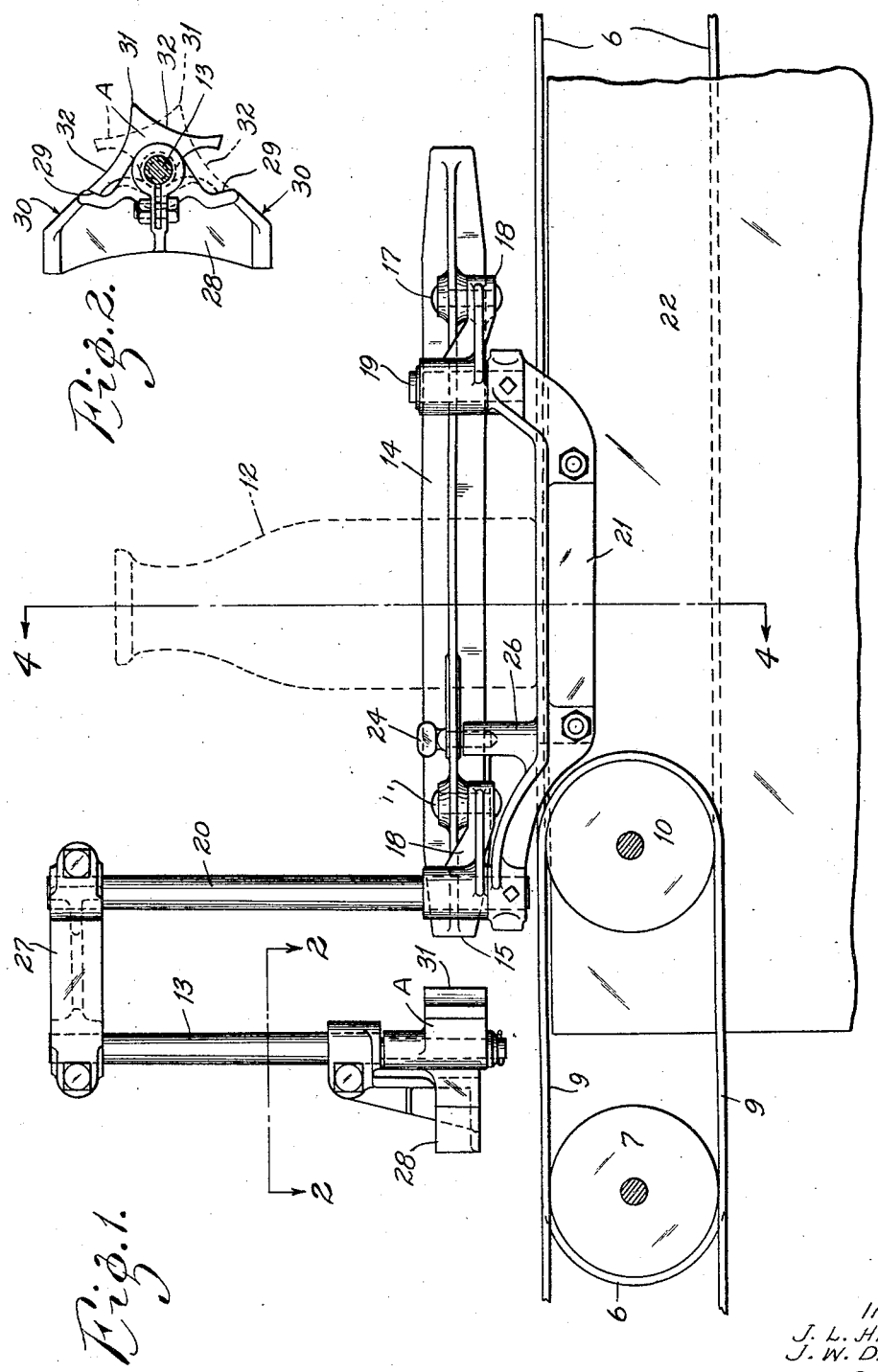

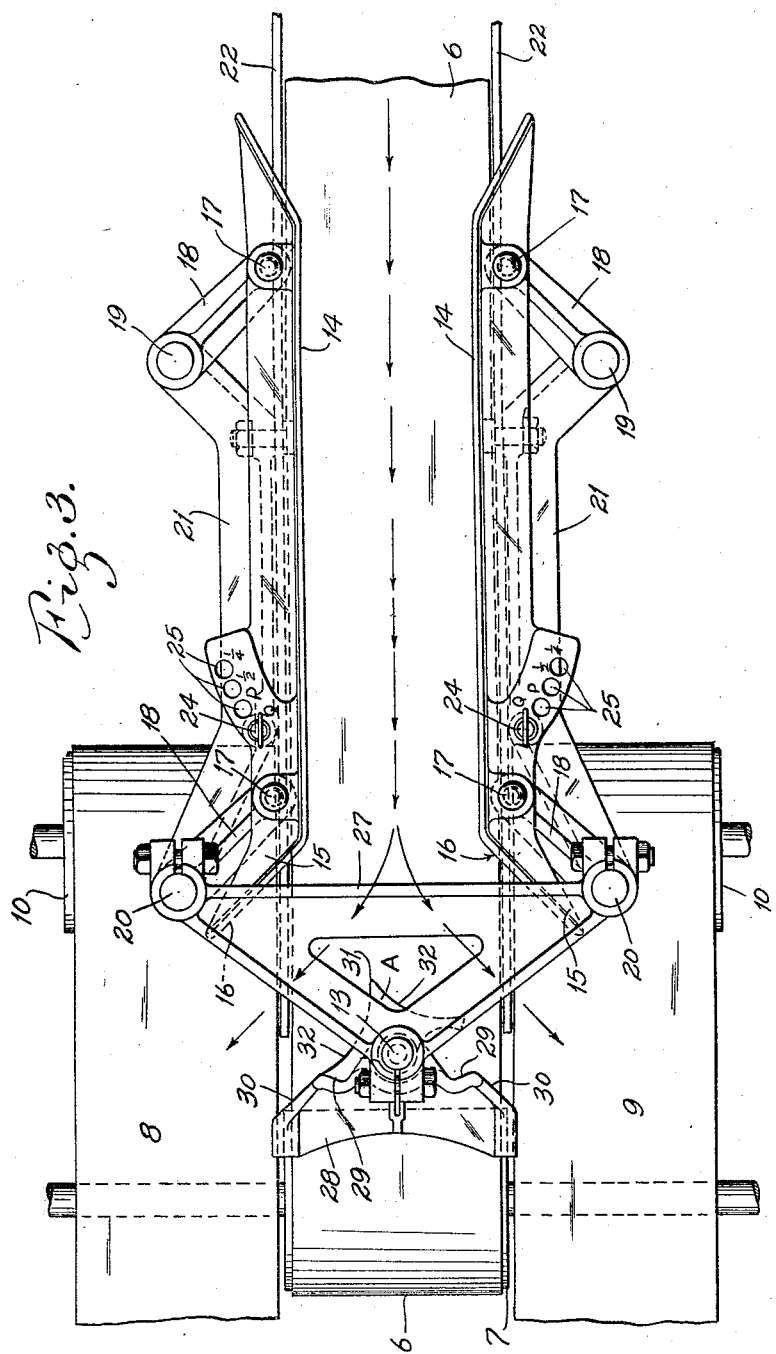

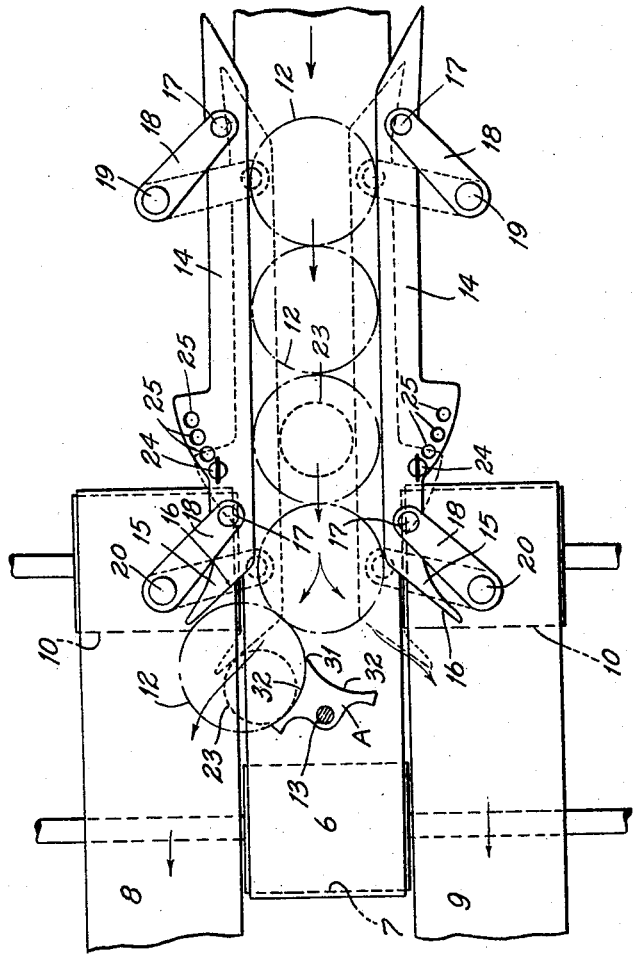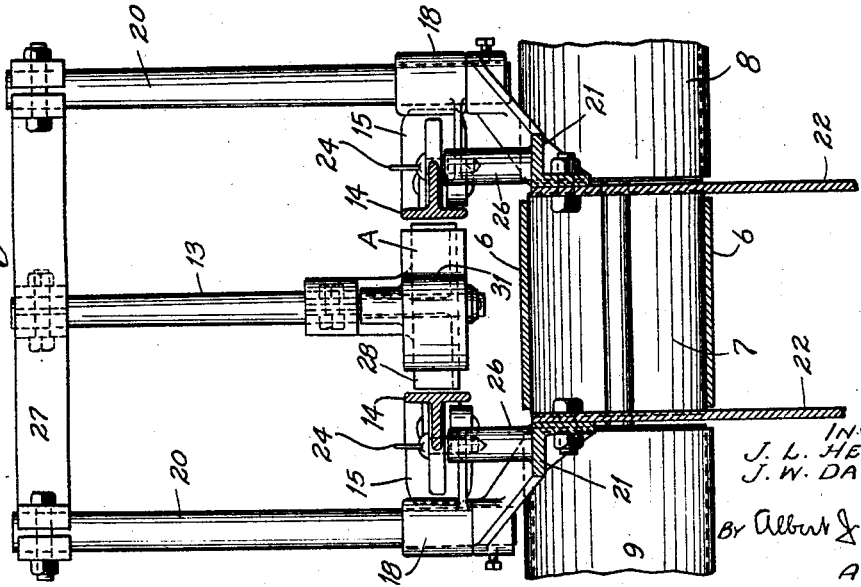

1,898,662

UNITED STATES PATENT OFFICE

JAMES L. HEROLD AND JOSEPH W. DAWSON, OF ST. LOUIS, MISSOURI, ASSIGNORS TO BARRY-WEHMILLER MACHINERY COMPANY, OF ST. LOUIS, MISSOURI, A CORPORATION OF MISSOURI

DISTRIBUTING FEEDER

Application filed October 13, 1930. Serial No. 488,274.

This invention relates to a distributing feeder whereby moving articles are directed into different paths. More specifically stated, the invention includes a separator, or divider, located at the path of a row of traveling articles, and this separator is movable from one position to another, so as to divert the articles into separate paths.

The separator may be associated with any suitable means for feeding bottles, or other articles, from a source of supply to different delivery stations. For example, the device may be used with traveling conveyors on which bottles are carried from a bottle washing machine to separate machines where the bottles are filled. A long row of the bottles can thus be transmitted from the washing machine through a path leading to the separator which diverts the bottles into different paths leading to the other machines.

One of the objects of the invention is to produce an extremely simple and inexpensive device of this kind. To illustrate one form of the invention, we have shown how the desired separation of the traveling articles can be obtained through the medium of a single moving element, and the power for actuating this moving element is transmitted from the traveling articles.

Ordinarily, a high degree of power cannot be conveniently transmitted through the moving articles. Therefore, one of our objects is to positively direct the articles into the separate paths, without transmitting any very substantial force from the articles to the movable separating member.

More specifically stated, the movable separating member engaged by the traveling articles may be pivotally supported and free to move in response to a very slight pressure. Consequently, the simple separating member is positively actuated to properly perform its function, without the aid of complex mechanism, and without any substantial degree of power.

Another object is to produce a novel adjustable device cooperating with a separator to direct articles of different dimensions into separate paths. In the preferred form of the invention this involves a pair of guide members movable toward and away from each other to vary the width of the passageway leading to the separator, and a pair of guide members movable toward and away from the separator to vary the width of the entrances to the separate passageways. In making the adjustment one pair of guide members is moved further than the other pair, and we have shown how an adjustment of this kind can be very accurately made with very little attention on the part of the operator.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. 1 is a side elevation of a device embodying the features of this invention.

Fig. 2 is a section on the line 2—2 in in Fig. 1 showing the movable separating member whereby the articles are directed into different paths, one extreme position of the separating member being shown by full lines, and the other extreme position being shown by dotted lines.

Fig. 3 is a top view of the device shown in Fig. 1.

Fig. 4 is a section on the line 4—4 in Fig. 1.

Fig. 5 is a diagrammatical top view with arrows indicating the paths of the articles, and dotted lines showing how the guide members may be adjusted for relatively small articles.

To illustrate one form of the invention, we have shown a bottle feeder comprising a traveling conveyor 6 passing around a pulley 7, and a pair of traveling conveyors 8 and 9 passing around pulleys 10 at opposite sides of the conveyor 6. The delivery end of the conveyor 6 lies between and adjacent to the receiving ends of the conveyors 8 and 9, so that a bottle leaving the conveyor 6 can pass onto one of the conveyors 8 or 9, as suggested by arrows in Figures 3 and 5.

The conveyors may be in the form of endless belts, traveling in the direction indicated by arrows. However, the invention is not limited to this feeding means, as any other suitable means may be employed to feed the articles to and from the separating member hereafter described.

In Fig. 5, the bottles 12 are shown by dot and dash lines, and in Fig. 1 one of these bottles is shown by dotted lines. A long row of the bottles is supported on the conveyor 6, and these bottles are alternately delivered to the conveyors 8 and 9, through the medium of a separator A which is free to oscillate on a vertical pivot rod 13. This separator A is actuated by the bottles, as will be hereafter described, to direct a bottle onto the conveyor 8 as suggested in Fig. 5, and after this operation, the separator is engaged and operated by the next bottle to direct said next bottle to the conveyor 9.

Before pointing out the details of the manner in which the separator is operated, we will refer to the guiding device which cooperates with the separator.

Guide members 14 are located above the conveyor 6, at opposite sides of the path of the bottles on said conveyor, and each guide member 14 is provided at one end with a retaining member 15 having a face 16 at an angle to the inner face of the guide member 14. The guide members 14 direct the bottles to the separator A, and the retaining members 15 cooperate with the separator to confine the bottles at the entrance to the diverging paths.

Each guide member 14 is pivoted at 17 to a pair of crank arms 18, and said arms are supported by pivots 19 and 20 extending from a stationary bar 21, the latter being secured to a stationary plate 22, as shown in Figures 1 and 4.

The crank arms 17 can be moved about the axes of their pivots 19 and 20 to shift the guide members 14 toward and away from each other, as suggested by dotted lines in Fig. 5. Full lines in Fig. 5 show the guide members 14 positioned to direct the large bottles 12 to the separator A, and dotted lines in this view show how the guide members may be adjusted to receive the small bottles 23.

After the guide members have been adjusted they are secured by means of locking pins 24 adapted to extend through holes 25 in the guide members. Each stationary bar 21 (Figures 1 and 4) is provided with a stationary vertical post 26 having an opening at the top to receive one of the locking pins 24.

As shown by Fig. 3, the holes 25 which receive the locking pins 24, may be provided with characters indicating the adjustments for different bottles. The indicating characters in Fig. 3 are Q, P, ½ and ¼, and they refer to quarts, pints, half-pints, and quarter-pints.

The crank arms 18 which support the guide members 14 are so arranged that a guide member 14 moves a relatively slight distance toward its companion guide member 14, while the extended retaining member 15 moves twice said distance in a direction toward the separator A.

For example, in making a reduction of one inch in the bottle receiving spaces, each guide member 14 will be moved a distance of one-half inch toward its companion guide member 14, but each retaining member 15 will move a distance of one inch toward the separator A. This differential adjustment is important, as it enables the several elements to be easily, quickly and properly adjusted for different bottles.

The means for supporting the separator A comprises the vertical rods 20 secured to the stationary bars 21, a triangular frame 27, secured to the upper ends of the rods 20, and the pivot rod 13 depending from said frame 27. The separator A is pivotally supported on the lower portion of the rod 13.

A stop device 28 is secured to the vertical rod 13, and this stop device is provided with abutment shoulders 29 (Figures 2 and 3) to limit the motions of the pivoted separator, and diverging guiding faces 30 extending from said shoulders to direct the bottles onto the conveyors 8 and 9.

Attention is now directed to details of the pivotally supported separator A. It is located at the entrance to the paths which diverge toward the conveyors 8 and 9. This separator has a projecting central portion 31 movable from one of said paths to the other, so as to open and close said paths, and oppositely disposed curved abutments 32 (Figures 2, 3 and 5) diverging from said projecting central portion 31 to direct the bottles into the respective paths.

The curved abutments 32 are located at the junction of said paths and engaged directly by the sides of the moving bottles to push the separator from one extreme position to the other. The retaining members 15 cooperate with the separator A to confine the bottles at the entrance to the diverging paths, and during the motion of the separator, a retaining member 15 retains the bottle in contact with one of the curved abutment faces 32, thereby insuring the desired transmission of movement from the bottle to the separator. The separator makes a complete stroke during each operation, and excess motion is prevented by the abutment shoulders 29, as shown in Figures 2 and 3.

During the separating operation, the leading bottle 12 in contact with the separator (Fig. 5) is at first advanced by the conveyor 6 on which it is seated, but before leaving the separator, the leading bottle just referred to reaches the conveyor 8, and the delivery to the conveyor 8 is aided by one of the stationary guiding faces 30, shown in Fig. 3. A final delivery impulse is usually transmitted through the next adjacent bottle which approaches the separator A while the leading bottle is moving on one of the conveyors 8 or 9.

The traveling bottles are thus diverted into separate paths by means of power derived from the conveyors on which the bottles are seated, and the transmission of this power to a separating device having only one moving part, namely, the freely pivoted separator A.

Another advantage lies in the simple differential adjustment whereby the guide members 14 are moved relatively slight distances toward each other while moving much greater distances toward the separator A, so as to provide bottle-receiving spaces of the desired uniformity in the several passageways.

We claim:

1. In a device for feeding bottles from a source of supply into separate paths, a separator movable from one position to another to divert the bottles into said separate paths, said separator having a projecting portion movable from one path to the other so as to open and close said paths, and oppositely disposed abutments extending from said projecting portion to direct the bottles into the respective paths, said abutments being located at the junction of said paths and engaged by the moving bottles to shift the separator from one of said positions to the other, oppositely disposed guide members whereby the bottles are directed to said separator, and retaining members cooperating with said separator to confine the bottles at the entrances to said paths, said guide members being adjustable toward and away from each other to receive bottles of different diameters, and said retaining members being adjustable toward and away from said abutments to provide for the transmission of movement from the different bottles to the separator.

2. In a device for feeding articles into separate paths, a separator movable from one position to another to divert the articles into said paths, guide members whereby the articles are directed to said separator, retaining members cooperating with said separator to confine the articles at the entrances of said paths, said guide members being adjustable toward and away from each other to receive articles of different dimensions, and the retaining members being adjustable toward and away from said separator to properly confine the different articles passing from said guide members.

3. In a device for feeding articles into separate paths, a separator movable from one position to another to divert the articles into said paths, guide members whereby the articles are directed to said separator, retaining members cooperating with said separator to confine the articles at the entrances of said paths, said guide members being adjustable toward and away from each other to receive articles of different dimensions, and the retaining members being adjustable toward and away from said separator to properly confine the different articles passing from said guide members, and a differential adjusting device whereby said guide members are moved relatively slight distances toward each other while the retaining members are moved greater distances toward said separator.

4. In a device for feeding articles into separate paths, a separator movable from one position to another to divert the articles into said paths, guide members whereby the articles are directed to said separator, retaining members cooperating with said separator to confine the articles at the entrances of said paths, said guide members being adjustable toward and away from each other to receive articles of different dimensions, and the retaining members being adjustable toward and away from said separator to properly confine the different articles passing from said guide members, each of said retaining members being movable with one of said guide members, and a differential adjusting device whereby said guide members are moved relatively slight distances toward each other while the retaining members are moved greater distances toward said separator, the elements of said differential adjusting device being so arranged that said relatively slight distances are approximately one half of said greater distances.

5. In a device for feeding articles from a source of supply into separate paths, a separator movable from one position to another to divert the articles into said separate paths, said separator having a projecting portion movable from one path to the other so as to open and close said paths, and abutments extending from said projecting portions to direct the articles into the respective paths, said abutments being located at the junction of said paths and engaged directly by the moving articles to shift the separator from one of said positions to the other, oppositely disposed guide members whereby the articles are directed to said separator, retaining members cooperating with said separator to confine the articles at the entrances to said paths, said guide members being adjustable toward and away from each other to receive bottles of different diameters, said retaining members being movable toward and away from said separator to provide for the transmission of movement from the different articles to the separator, one of said guide members being movable with one of said retaining members, and an adjusting device whereby the last mentioned guide member is moved a relatively slight distance toward its companion guide member while the last mentioned retaining member is moved a greater distance in a direction toward said separator.

6. In a device for feeding articles from a source of supply into separate paths, a separator movable from one position to another to divert the articles into said separate paths, said separator having a projecting portion movable from one path to the other so as to open and close said paths, and abutments extending from said projecting portion to direct the articles into the respective paths, said abutments being located at the junction of said paths and engaged directly by the moving articles to shift the separator from one of said positions to the other, oppositely disposed guide members whereby the articles are directed to said separator, retaining members cooperating with said separator to confine the articles at the entrances to said paths, said guide members being adjustable toward and away from each other to receive bottles of different diameters, said retaining members being movable toward and away from said separator to provide for the transmission of movement from the different articles to the separator, one of said guide members being movable with one of said retaining members, and an adjusting device whereby the last mentioned guide member is moved a relatively slight distance toward its companion guide member while the last mentioned retaining member is moved a greater distance in a direction toward said separator, said adjusting device including a pivotally supported shifter cooperating with both of said last mentioned members to simultaneously adjust both of said members.

7. In a device for feeding bottles from a source of supply into separate paths, a pivotally supported separator movable from one position to another to divert the bottles into said separate paths, said separator having a projecting central portion movable from one path to the other so as to open and close said paths, and oppositely disposed curved abutments diverging from said central portion to direct the bottles into the respective paths, said curved abutments being located at the junction of said paths and engaged directly by the sides of the moving bottles to push the separator from one of said positions to the other, oppositely disposed guide members whereby the bottles are directed to said operator, retaining members cooperating with said separator to confine the bottles at the entrances to said paths, said guide members being adjustable toward and away from each other to receive bottles of different diameters, the retaining members being movable toward and away from said separator to provide for the transmission of movement from the different bottles to the separator, one of said guide members being united with one of said retaining members, and crank arms whereby the united members are adjusted, the pivots of the crank arms being so arranged that the guide member is moved a relatively slight distance toward its companion guide member while the retaining member united therewith is moved twice said distance in a direction toward said separator.

In testimony that we claim the foregoing we hereunto affix our signatures.

JAMES L. HEROLD.
JOSEPH W. DAWSON.